United States Patent
Brandenburger et al.

(10) Patent No.: US 12,005,026 B2
(45) Date of Patent: Jun. 11, 2024

(54) INFUSION BAG

(71) Applicant: Fresenius Kabi Deutschland GmbH, Bad Homburg (DE)

(72) Inventors: Torsten Brandenburger, Friedberg (DE); Beatrix Heuel-Hoemmen, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 498 days.

(21) Appl. No.: 17/253,424

(22) PCT Filed: Aug. 20, 2019

(86) PCT No.: PCT/EP2019/072263
§ 371 (c)(1),
(2) Date: Dec. 17, 2020

(87) PCT Pub. No.: WO2020/038941
PCT Pub. Date: Feb. 27, 2020

(65) Prior Publication Data
US 2021/0169739 A1    Jun. 10, 2021

(30) Foreign Application Priority Data
Aug. 21, 2018 (EP) .................... 18189930

(51) Int. Cl.
*A61J 1/14* (2023.01)
*A61J 1/10* (2006.01)
(Continued)

(52) U.S. Cl.
CPC .............. *A61J 1/10* (2013.01); *A61J 1/1406* (2013.01); *A61J 1/1431* (2015.05); *A61J 1/1481* (2015.05);
(Continued)

(58) Field of Classification Search
None
See application file for complete search history.

(56) References Cited

U.S. PATENT DOCUMENTS 5,783,269 A   7/1998   Heilmann et al.
5,928,744 A   7/1999   Heilmann et al.
(Continued)

FOREIGN PATENT DOCUMENTS

AU     515643 B2     4/1981
CL     199401683     11/1994
(Continued)

OTHER PUBLICATIONS

Septon™ product literature, Kuraray (Year: 2023).*
(Continued)

*Primary Examiner* — Ramsey Zacharia
(74) *Attorney, Agent, or Firm* — Blank Rome LLP

(57) ABSTRACT

The invention relates to a medical package designed as an infusion bag, which medical package is made from multi-layer films that are welded to one another and is filled with a medical liquid for infusion and/or for parenteral nutrition. The invention is described by a medical package designed as an infusion bag, which is made up of a film comprising multiple layers welded to one another and has at least one weld seam, preferably longitudinal and transverse weld seams, and is filled with a medical liquid. The multi-layer film has at least one inner layer of a matrix-phase polymer system, an intermediate layer of a matrix-phase polymer system, and an outer layer of a matrix-phase polymer system. The matrix polymer of the matrix-phase polymer system of the inner layer, the intermediate layer and the outer layer in each case comprises a polypropylene polymer (PP) having defined parts by weight in the individual layers, and the phase polymer of the matrix-phase polymer system of the inner layer, the intermediate layer and the outer layer (Continued)

in each case comprises a styrene-ethylene/butyl-styrene block copolymer (SEBS) having defined parts by weight in the individual layers. The film is characterised in that the styrene-ethylene/butyl-styrene block copolymer (SEBS) of the intermediate layer has a styrene-ethylene/butylene ratio ($S/EB_M$) and the styrene-ethylene/butylene-styrene block copolymer (SEBS) of the outer layer has a styrene-ethylene/butylene ratio ($S/EB_A$), in which $S/EB_A > S/EB_M$. It has been shown that in this way the mechanical properties of the multi-layer film can be improved, in particular in the event of expansion of the multi-layer film in the region of the weld seams. The improved mechanical properties appear both at room temperature and also at lower temperatures of down to 4° C.

18 Claims, 2 Drawing Sheets

(51) Int. Cl.
*B32B 3/08* (2006.01)
*B32B 27/08* (2006.01)
*B32B 27/30* (2006.01)
*B32B 27/32* (2006.01)

(52) U.S. Cl.
CPC ............... *B32B 3/08* (2013.01); *B32B 27/08* (2013.01); *B32B 27/302* (2013.01); *B32B 27/32* (2013.01); *B32B 2250/03* (2013.01); *B32B 2250/246* (2013.01); *B32B 2270/00* (2013.01); *B32B 2274/00* (2013.01); *B32B 2307/412* (2013.01); *B32B 2307/51* (2013.01); *B32B 2307/558* (2013.01); *B32B 2307/5825* (2013.01); *B32B 2439/46* (2013.01); *B32B 2439/80* (2013.01)

(56) References Cited

U.S. PATENT DOCUMENTS

| | | |
|---|---|---|
| 5,998,019 A | 12/1999 | Rosenbaum et al. |
| 6,004,311 A | 12/1999 | Heilmann et al. |
| 6,004,636 A | 12/1999 | Nicola et al. |
| 6,017,598 A | 1/2000 | Kreischer et al. |
| 6,461,696 B1 | 10/2002 | Ling et al. |
| 2011/0249916 A1 | 10/2011 | Herrenbauer et al. |
| 2013/0072895 A1* | 3/2013 | Kreischer ............... B29C 48/08 604/408 |

FOREIGN PATENT DOCUMENTS

| | | |
|---|---|---|
| CL | 199700643 | 4/1997 |
| CL | 200100293 | 2/2001 |
| CL | 201101163 | 5/2011 |
| CL | 201702860 | 11/2017 |
| JP | 4086421 B2 | 5/2008 |
| KR | 20010076525 A | 8/2001 |
| KR | 20030046120 A | 6/2003 |
| WO | 199737628 | 10/1997 |
| WO | 2011128185 A1 | 10/2011 |
| WO | 2016180869 | 5/2016 |

OTHER PUBLICATIONS

Tuftec™ product literature, Asahi Kasei (Year: 2015).*
Asahi Kasei Corporation, Tuftec H Series, P Series Selectively Hydrogenated Type, M Series Acid or Amine Modified Type, Hydrogenated Styrenic Thermoplastic Elastomer (SEBS), Apr. 2016 (20 pages).
Larsson et al., Leachable/extractable issues in a pharmacy setting, Hospital Pharmacy Europe, May 28, 2015 (10 pages).
Fresenius Kabi Deutschland GmbH, FFX Film Composition, Aug. 21, 2018 (1 page).

* cited by examiner

INFUSION BAG

CROSS-REFERENCE TO RELATED APPLICATIONS

This application is a national phase under 35 U.S.C. 371 of International Application No. PCT/EP2019/072263 filed on Aug. 20, 2019, which claims the benefit of the Aug. 21, 2018 priority date of European Application No. 18189930.3, the contents of all of which are hereby incorporated by reference in their entirety.

FIELD OF THE INVENTION

The invention relates to a medical package designed as an infusion bag, which medical package is made from films comprising multiple layers welded to one another and which is filled with a medical liquid for infusion or for parenteral nutrition.

BACKGROUND OF THE INVENTION

Infusion bags, which consist of films comprising multiple layers welded to one another, are known. They consist of films that are welded directly to one another and comprise at least one withdrawal port. The requirements for infusion bags are high. Thus, infusion bags must withstand mechanical loads to a significant extent. At the same time, the films used for this purpose must be free of contaminants. In general, there is also the requirement to be able to subject the infusion bag to thermal sterilization, typically at a temperature of 121° C.

Amongst others, PVC films are used. Multi-layer films of PP (polypropylene) are, however, particularly suitable. The tear resistance can in particular be increased through different layers of PP, i.e. by providing a multi-layer PP film. Infusion bags made of multi-layer, flexible films have a high mechanical stability in regard to the tearing of a film, since the film can yield in the case of mechanical loads. In the case of flexible films, it is, in turn however, more difficult to ensure high mechanical stability in the region of the weld seams.

It is also known that the mechanical properties of PP films can be improved by providing a matrix-phase polymer system. In this case, a thermoplastic elastomer can be distributed e.g. in a PP matrix. This increases the impact strength of the material and thus improves the tear resistance of a multi-layer composite.

For example, the patent document U.S. Pat. No. 5,783, 269 A (Fresenius AG) presents a multi-layer PP film. The layers of this film can comprise a styrene-ethylene/butylene-styrene block copolymer (SEBS) or a styrene-isoprene-styrene block copolymer (SIS). In this way, the stability in the case of impact and tensile loads can be improved. Multi-layer PP films with SEBS are also described in the two patent applications WO 2011/128185 A1 and KR 2003 046120 A.

OBJECT OF THE INVENTION

The object underlying the invention is to improve the mechanical properties of a medical package designed as an infusion bag based on polypropylene.

It is in particular an object of the invention to provide an infusion bag made of a multi-layer PP film, in which the film has a high flexibility in the region of the weld seams, without the weld seam being torn.

SUMMARY OF THE INVENTION

The object of the invention is already achieved by a medical package designed as an infusion bag according to claim 1.

Preferred embodiments of the invention can be inferred from the subject matter of the dependent claims, the description and the drawings.

The invention will be described generally by a medical package designed as an infusion bag, which is made up of a film comprising multiple layers welded to one another and has at least one weld seam, preferably longitudinal and transverse weld seams, and is filled with a medical liquid, with the multi-layer film having at least one inner layer of a matrix-phase polymer system, an intermediate layer of a matrix-phase polymer system, and an outer layer of a matrix-phase polymer system, with the matrix polymer of the matrix-phase polymer system of the inner layer, the intermediate layer and the outer layer each comprising a polypropylene polymer (PP) and the phase polymer of the matrix-phase polymer system of the inner layer, the intermediate layer and the outer layer each comprising a styrene-ethylene/butylene-styrene block copolymer (SEBS), and with the styrene-ethylene/butylene-styrene block copolymer (SEBS) of the intermediate layer having a styrene-ethylene/butylene ratio ($S/EB_M$) and the styrene-ethylene/butylene-styrene block copolymer (SEBS) of the outer layer having a styrene-ethylene/butylene ratio ($S/EB_A$), in which in particular $S/EB_A > S/EB_M$.

According to claim 1, the invention will be described by a medical package designed as an infusion bag, which is made up of a film comprising multiple layers welded to one another and has at least one weld seam and is filled with a medical liquid, with the multi-layer film having at least one inner layer of a matrix-phase polymer system, an intermediate layer of a matrix-phase polymer system, and an outer layer of a matrix-phase polymer system, with the matrix polymer of the matrix-phase polymer system of the inner layer comprising a polypropylene polymer (PP) with a proportion by weight $G_{IM}$ in the range of 70-90% by weight and the phase polymer of the matrix-phase polymer system of the inner layer comprising a styrene-ethylene/butylene-styrene block copolymer (SEBS) with a proportion by weight $G_{IP}$ in the range of 10-30% by weight, the matrix polymer of the matrix-phase polymer system of the intermediate layer comprising a polypropylene polymer (PP) with a proportion by weight $G_{MM}$ in the range of 40-60% by weight and the proportion by weight $G_{MP}$ of the phase polymer of the matrix-phase polymer system of the intermediate layer (9b) being in the range of 40-60% by weight and comprising styrene-ethylene/butylene-styrene block copolymer (SEBS), the matrix polymer of the matrix-phase polymer system of the outer layer comprising a polypropylene polymer (PP) with a proportion by weight $G_{AM}$ in the range of 75-95% by weight and the phase polymer of the matrix-phase polymer system of the outer layer comprising a styrene-ethylene/butylene-styrene block copolymer (SEBS) with a proportion by weight $G_{AP}$ of the phase polymer in the range of 5-25% by weight, with the styrene-ethylene/butylene-styrene block copolymer (SEBS) of the intermediate layer having a styrene-ethylene/butylene ratio ($S/EB_M$) and the styrene-ethylene/butylene-styrene block copolymer (SEBS) of the outer layer having a styrene-ethylene/butylene ratio (S/EB$_A$), in which S/EB$_A$>S/EB$_M$.

The medical package designed as an infusion bag is made up of a film comprising multiple layers welded to one another and has at least one weld seam, preferably at least one longitudinal and at least one transverse weld seam, along which two multi-layer films are welded to one another.

In particular, the package comprises two longitudinal and two transverse weld seams.

Furthermore, the package designed as an infusion bag can still comprise at least one port for withdrawing a medical liquid. The port is in particular with its lower part welded in the weld seam or one of the weld seams, in particular in a transverse weld seam. The lower part of the port can be configured for example in the shape of a shuttle. The port can be part of a connector, in which in particular a sealing element is arranged. A needle, a spike or a Luer-lock connector can for example be connected to the connector.

The medical package can also still comprise a hanger for attaching to a rack or an infusion stand. The hanger can in particular be designed as a recess or indentation in a transverse weld seam opposite the port.

The package according to the invention is filled with a medical liquid, for example with a saline solution. The package preferably comprises a storage capacity of 50 to 1000 ml, in particular per chamber.

The multi-layer film used for the package is a film based on polypropylene. It is a film comprising polypropylene as a main constituent, which in particular, as mentioned below, forms a PP matrix. The film is preferably free of PVC.

The multi-layer film has at least three, preferably exactly three, layers. The layers are connected to one another in a materially-bonded manner. The layers are in particular connected to one another by co-extruding and joining together in the hot state.

The multi-layer film comprises at least one inner layer made of a matrix-phase polymer system, an intermediate layer made of a matrix-phase polymer system and an outer layer made of a matrix-phase polymer system.

The inner layer is in contact with the medical liquid. The outer layer represents the surface of the medical package designed as an infusion bag.

In the case of a matrix-phase polymer system, at least two different polymers are present, with one polymer being present separated, in particular as dispersively distributed rigid drops, in the matrix of the other polymer.

The matrix polymer of the matrix-phase polymer system of the inner layer, the intermediate layer and the outer layer each comprises a polypropylene polymer. The matrix consists in particular of a polypropylene.

The phase polymer of the matrix-phase polymer system of the inner layer, the intermediate layer and the outer layer each comprises at least one styrene-ethylene/butylene-styrene block copolymer (SEBS) as the phase polymer.

SEBS is a block polymer composed of styrene and butylene and ethylene portions and comprising a hydrogenated butadiene portion to which styrene groups adjoin. This is in particular produced by polymerization of a styrene and butadiene monomer and subsequent hydrogenation of the previously polymerized SBS. The hydrated butadiene forms a soft intermediate block between styrene blocks. The SEBS enters into a good connection with the PP matrix polymer.

The styrene-ethylene/butylene-styrene block copolymer (SEBS) of the intermediate layer has a styrene-ethylene/butylene ratio S/EB$_M$. The styrene-ethylene/butylene-styrene block copolymer (SEBS) of the outer layer has a styrene-ethylene/butylene ratio S/EB$_A$. The styrene-ethylene/butylene ratio is in each case the proportion by weight of styrene divided by the proportion by weight of the sum of ethylene and butylene.

The weight ratio of styrene to the sum of ethylene and butylene can be determined by determining the weight of the styrene and butadiene monomer used for the polymerization. After polymerization, the content of styrene can be determined with UV spectrometry. After extracting and dissolving the sample, the measurement can be carried out with a UV spectrometer. The proportion of bonded styrene is calculated by means of peak absorption at an absorption wavelength, assigned to a styrene component, using a calibration curve.

According to the invention, S/EB$_A$>S/EB$_M$. The intermediate layer thus has a higher butylene/ethylene proportion than the outer layer.

It has been shown that in this way the mechanical properties of the multi-layer film can be significantly improved, in particular in the event of expansion of the multi-layer film in the region of the weld seams.

In particular, it was possible for the sterile multi-layer film to also be expanded in the region of its weld seams, preferably of its longitudinal weld seams, to at least 150%, preferably at least 200% of its length, without the film tearing in the region of the weld seam.

The maximum expansion (elongation at break according to DIN EN ISO 527 (Version 2012-06)) of the unsterile, unwelded multi-layer film alone is preferably above 500%, particularly preferably above 600% and/or below 800%. The tensile strength of the unsterile, multi-layer film alone is preferably above 20 N/mm$^2$ and/or below 40 N/mm$^2$.

The multi-layer, unsterile film has a measurable yield strength. The yield strength (measured according to DIN EN ISO 527) is preferably above 5 N/mm$^2$, particularly preferably above 6 N/mm$^2$, and/or below 15 N/mm$^2$. The elongation upon reaching the yield strength is preferably above 10%, particularly preferably above 15% and/or below 30%.

After a thermal sterilization, a yield strength cannot be determined on the film of the package designed as an infusion bag. The maximum elongation (elongation at break according to DIN EN ISO 527 (Version 2012-06)) of the sterilized, multi-layer film alone is preferably above 400%, particularly preferably above 500% and/or below 700%. The tensile strength of the sterile, multi-layer film is preferably above 20 N/mm$^2$ and/or below 40 N/mm$^2$. The improved mechanical properties on the sterilized bag appear both at room temperature and also at lower temperatures of down to 4° C.

In addition to a softer material of the intermediate layer, the distribution of the SEBS in the PP matrix could be responsible for the improved mechanical properties, without being bound to a theory.

In the case of one embodiment of the invention, the styrene-ethylene/butylene-styrene block polymer of the inner layer has a styrene-ethylene/butylene ratio S/EB$_I$, in which S/EB$_I$>S/EB$_M$. An inner layer with a butylene/ethylene proportion which is low compared to the intermediate layer is thus also provided.

According to one embodiment of the invention, S/EB$_A$>1.2 S/EB$_M$, preferably S/EB$_A$>1.5 S/EB$_M$, and/or S/EB$_I$>1.2 S/EB$_M$, preferably S/EB$_I$>1.5 S/EB$_M$, and/or S/EB$_I$=S/EB$_A$. Preferably S/EB$_A$<2.0 S/EB$_M$ and/or S/EB$_I$<2.0 S/EB$_M$.

The SEBS used for the intermediate layer is preferably softer than the SEBS used for the inner and/or outer layer. In particular, the intermediate layer or the SEBS of the intermediate layer has a Shore hardness A (measured according to DIN EN ISO 868 (Version 2003-10) and DIN ISO 7619-1 (Version 2012-02)) of below 50, preferably below 45 and/or above 30.

The SEBS used for the inner and/or outer layer can have a Shore hardness A of above 55, preferably above 62 and/or below 80.

The ratio $S/EB_M$ of the intermediate layer is, in the case of one embodiment of the invention, below 0.16, preferably below 0.14 and/or above 0.10, preferably above 0.13. An SEBS polymer with such properties is for example available under the commercial designation Asahi Tuftec® H1221.

The S/EB ratio of the inner and/or the $S/EB_A$ ratio of the outer layer is, in the case of one embodiment of the invention, above 0.18, preferably above 0.20 and/or below 0.28, preferably below 0.24. An SEBS polymer with such properties is for example available under the commercial designation Asahi Tuftec® H1062.

In the case of a further development of the invention, the phase polymer of the matrix-phase polymer system of the intermediate layer also comprises a styrene-isoprene-styrene block copolymer (SIS).

In particular, the styrene-ethylene/butylene-styrene block copolymer (SEBS) is provided with a proportion by weight $G_{MP1}$ and the styrene-isoprene-styrene block polymer (SIS) is provided with a proportion by weight $G_{MP2}$, in which $G_{MP1} > 3\ G_{MP2}$ and/or $G_{MP1} < 5\ G_{MP2}$.

The matrix polymer of the intermediate layer is, according to a further embodiment of the invention, a polypropylene random copolymer. This polypropylene random copolymer enters into a good connection with the SEBS used with the high butylene/ethylene proportion and contributes to a soft, intermediately layer.

According to one embodiment, the matrix polymer has in the intermediate layer a proportion by weight $G_{MM}$ which substantially corresponds to the proportion by weight $G_{MP}$ of the phase polymer or $G_{MP1}+2$ of the phase polymers. In particular, $G_{MM}=0.9-1.1*G_{MP1}+2$ or $G_{MM}=0.9-1.1*G_{MP}$. $G_{MP}$ is in particular the sum of $G_{MP1}$ and $G_{MP2}$.

The matrix polymer of the outer layer is, according to one embodiment of the invention, not a PP random copolymer, but rather a polypropylene homopolymer. In this way, a fixed, outer layer of the layer packet is achieved.

The softening temperature (Vicat softening temperature A/50/N) of the polypropylene used for the outer layer is preferably higher than the polypropylene used for the intermediate and/or inner layer. In particular, the polypropylene of the outer layer has a softening temperature at least 10° C., preferably at least 15° C. higher than the polypropylene of the intermediate layer.

The Vicat softening temperature A/50/N of the PP of the outer layer is preferably above 140° C., particularly preferably above 150° C. and/or below 170° C. (measured according to DIN EN ISO 306 (Version 2014-03)).

The film according to the invention presents good weldability and good resistance in the case of thermal sterilization, in particular in the case of autoclaving.

The PP polymer used for the outer layer is preferably harder than at least the PP polymer used for the intermediate layer. According to one embodiment of the invention, the PP polymer used for the outer layer has a ball impression hardness H 358/30 (according to DIN 53 505 (Version 2000-08)/ISO 2039 (Version 2003-06)) of above 55 MPa, preferably above 60 MPa and/or below 80 MPa. The PP used for the intermediate and/or inner layer can have a ball impression hardness H 358/30 of below 60 MPa, preferably below 50 and/or above 35 MPa.

The matrix polymer preferably has in the outer layer a proportion by weight $G_{AM}$ and the phase polymer a proportion by weight $G_{AP}$, in which $G_{AM} > 4\ G_{AP}$.

According to one embodiment of the invention, the matrix polymer has in the inner layer a proportion by weight $G_{IM}$ and the phase polymer has a proportion by weight $G_{IP}$, in which $G_{IM} > 3\ G_{IP}$. In particular, in inner layer the proportion by weight $G_{IM}$ of the matrix polymer is in the range of 70-90% by weight and the proportion by weight $G_{IP}$ of the phase polymer is in the range of 10-30% by weight.

The matrix polymer of the inner layer is preferably also a polypropylene random copolymer.

The matrix polymer has in the outer layer a proportion by weight $G_{AM}$ and the phase polymer has a proportion by weight $G_{AP}$, in which preferably $G_{AM} > 4\ G_{AP}$.

In the outer layer, the proportion by weight $G_{AM}$ of the matrix polymer is preferably in the range of 75-95% by weight and the proportion by weight $G_{AP}$ of the phase polymer is in the range of 5-25% by weight.

The proportion by weight $G_{MP1}+2$ of the phase polymer in the intermediate layer is preferably higher compared to the proportion by weight $G_{AP}$ of the phase polymer in the outer layer, in which $G_{MP1+2} > 3\ G_{AP}$ and/or $G_{MP1+2} < 5\ G_{AP}$.

In the intermediate layer, the proportion by weight $G_{MM}$ of the matrix polymer is preferably in the range of 40-60% by weight and/or the proportion by weight $G_{MP}$ of the phase polymer or the proportion by weight $G_{MP1}+2$ of the phase polymers is in the range of 40-60% by weight. In one embodiment, $G_{MP}$ is composed, preferably at least, of $G_{MP1}$ and $G_{MP2}$.

In particular, in the intermediate layer, the proportion by weight $G_{MP1}$ of the styrene-ethylene/butylene-styrene block copolymer (SEBS) as a phase polymer is in the range of 30-55% by weight and/or the proportion by weight $G_{MP2}$ of the styrene-isoprene-styrene block polymer (SIS) as a further phase polymer is in the range of greater than or equal to 0-20% by weight.

According to one embodiment of the invention, the inner layer has a thickness $D_I$, the intermediate layer a thickness $D_M$ and the outer layer a thickness $D_A$, in which $4\ D_I < D_M < 5\ D_A$ and/or $4\ D_A < D_M < 5\ D_I$.

The multi-layer film used for the package preferably has a total thickness of above 150 μm, particularly preferably of above 180 μm and/or of below 250 μm, particularly preferably of below 220 μm.

The inner and/or the outer layer of the multi-layer film preferably has a thickness of above 15 μm, particularly preferably of above 25 μm and/or of below 45 μm, particularly preferably of below 35 μm.

The intermediate layer preferably has a thickness of above 100 μm, particularly preferably of above 120 μm and/or of below 170 μm, particularly preferably of below 150 μm, in particular of 125 μm to 145 μm, According to the invention, the medical package is designed as an infusion bag filled with a medical liquid. The medical liquid is a liquid, which is used for medical purposes and is administered preferably intravenously here. In a preferred embodiment, the medical liquid is therefore an infusion solution. Possible examples of such infusion solutions include sterile water;
saline solutions, in particular solutions with NaCl—, KCl—, CaCl— and/or Mg;
solutions with carbohydrates, in particular glucose solutions;

solutions, emulsions and/or suspensions with nutrients for parenteral nutrition, in particular with lipids, amino acids and/or glucose;

colloid solutions, in particular for blood replacement therapy (e.g. Voluven®); and/or so-called pre-mixed systems, in which an active ingredient, e.g. paracetamol, is already added to the medical liquid.

The medical package designed as an infusion bag, which medical package is filled with a medical liquid, can also be designated as a pharmaceutical product.

The medical package designed as an infusion bag preferably has a storage capacity of 50 ml to 1000 ml.

If the infusion bag is for example designed as a multi-chamber bag, then it can also comprise a total storage capacity of up to 3000 ml. Thus, the infusion bag can, according to one exemplary embodiment, be configured as a three-chamber bag for parenteral nutrition. Each chamber in each case contains a constituent (lipids, amino acids or glucose). The three chambers must firstly be separated from one another for example by inner, tearable seams. Prior to applying the nutritional composition, these inner separating seams must be torn off and the constituents mixed together.

The features, mentioned above in the description, of the medical package designed as an infusion bag, which medical package is made up of a film comprising multiple layers welded to one another and has at least one weld seam, and is filled with a medical liquid and the features described in the claims are also features of the weldable film described below and/or of the welding method described below.

The invention can also be described by a weldable film, in particular for the medical package described above and designed as an infusion bag. The film is a multi-layer film, with the multi-layer film having at least one inner layer made of a matrix-phase polymer system, an intermediate layer made of a matrix-phase polymer system, and an outer layer made of a matrix-phase polymer system, with the matrix polymer of the matrix-phase polymer system of the inner layer, the intermediate layer and the outer layer each comprising a polypropylene polymer (PP) and the phase polymer of the matrix-phase polymer system of the inner layer, the intermediate layer and the outer layer each comprising a styrene-ethylene/butylene-styrene block copolymer (SEBS), characterized in that the styrene-ethylene/butylene-styrene block copolymer (SEBS) of the intermediate layer has a styrene-ethylene/butylene ratio $S/EB_M$ and the styrene-ethylene/butylene-styrene block copolymer (SEBS) of the outer layer has a styrene-ethylene/butylene ratio $S/EB_A$, in which $S/EB_A > S/EB_M$.

The film is processed using a welding method, for example using an impulse welding method, to produce a medical package designed as an infusion bag and made of a multi-layer film, with the multi-layer film having at least one inner layer made of a matrix-phase polymer system, an intermediate layer made of a matrix-phase polymer system and an outer layer made of a matrix-phase polymer system, with the matrix polymer of the matrix-phase polymer system of the inner layer, the intermediate layer and the outer layer each comprising a polypropylene polymer (PP) and the phase polymer of the matrix-phase polymer system of the inner layer, the intermediate layer and the outer layer each comprising a styrene-ethylene/butylene-styrene block copolymer (SEBS), characterized in that the styrene-ethylene/butylene-styrene block copolymer (SEBS) of the intermediate layer has a styrene-ethylene/butylene ratio $S/EB_M$ and the styrene-ethylene/butylene-styrene block copolymer (SEBS) of the outer layer has a styrene-ethylene/butylene ratio $S/EB_A$, in which $S/EB_A > S/EB_M$.

An improved package made of a multi-layer PP film can be provided by the invention. The film has a high expandability in the region of the weld seams, without tearing of the weld seams or in the region of the weld seams occurring.

The PP proportion of the multi-layer film is preferably above 55% by weight, particularly preferably above 60% by weight and/or below 70% by weight, particularly preferably below 65% by weight.

BRIEF DESCRIPTION OF THE DRAWINGS

The subject matter of the invention will be explained in more detail below with reference to a schematically represented exemplary embodiment on the basis of the drawings FIG. 1 to FIG. 4.

DETAILED DESCRIPTION OF THE DRAWINGS

Figure 1:
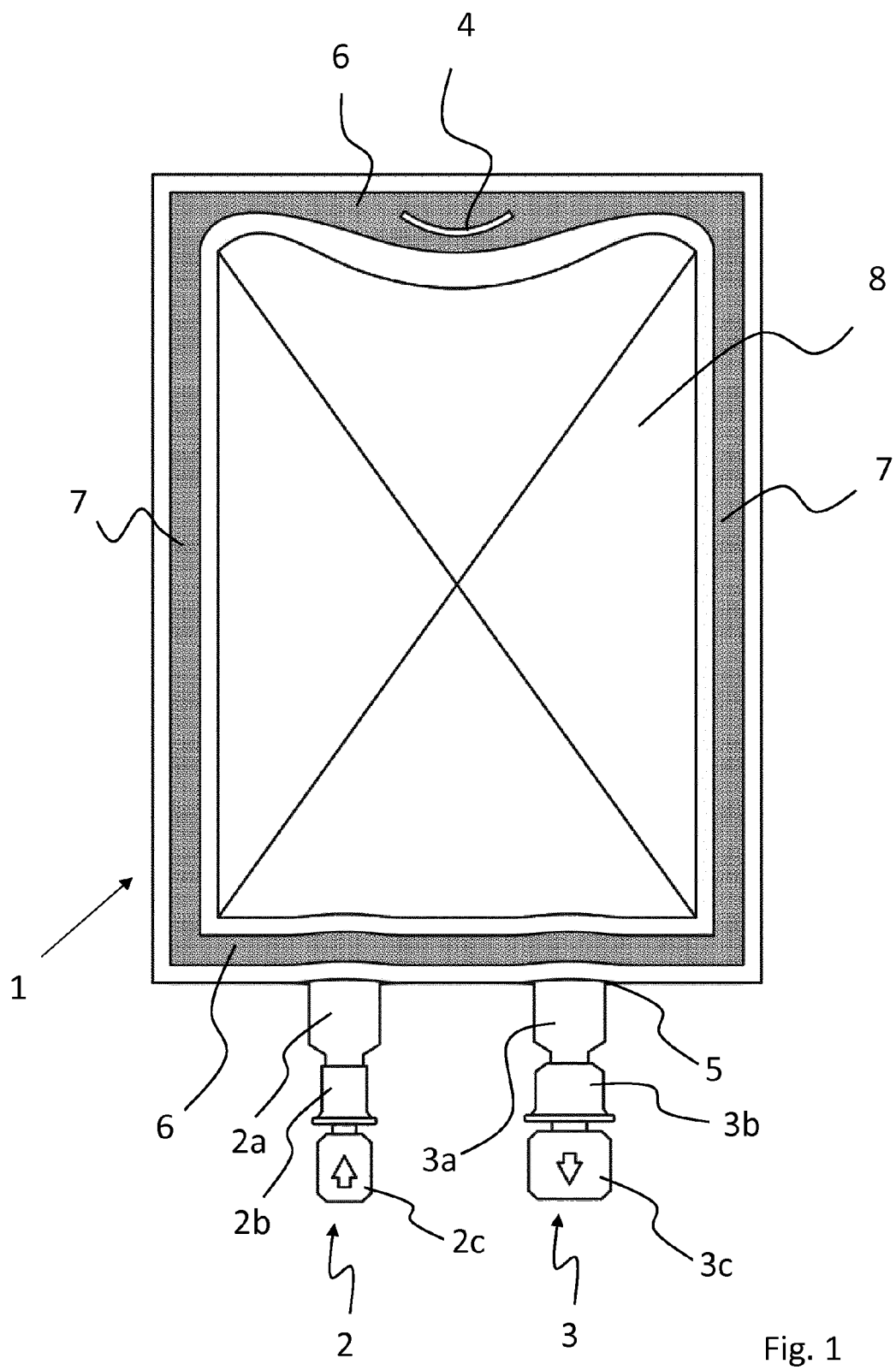
FIG. 1 shows a medical package designed as an infusion bag.

FIG. 1 shows a medical package designed as an infusion bag 1.

The infusion bag 1 consists of two multi-layer films 8 welded to one another. The multi-layer films 8 are connected to one another via the longitudinal weld seams 7 and the transverse weld seams 6, such that a bag is formed, which is filled with a medical liquid. The bag 1 is here a single-chamber bag.

The multi-layer films 8 are for example connected to one another by means of an impulse welding method. In this case, the films 8 are welded by means of a welding tool with heatable sealing strips, which come into contact with the film, by the sealing strips being temporarily heated, such that the films clamped between the sealing strips are molten at least in sections and are thus welded. An impulse welding method is for example illustrated in the published patent application EP 0 911 141 A2 (Fresenius Medical Care Deutschland GmbH).

The infusion bag 1 comprises at least one port, in this exemplary embodiment two ports 2a, 3a, of which one port 2a serves to fill liquid, for example to dose a medicine, and another port 3a to withdraw the medical liquid.

The ports 2a, 3a comprise in this exemplary embodiment a weld-in shuttle, by means of which they are welded in a region 5 of a transverse weld seam 6.

The two ports 2a and 3a here each provide the lower part of a connector 2 and 3. The two connectors 2 and 3 are each formed by the two mentioned lower parts 2a and 3a and by the upper parts 2b and 3b. The upper part 2b, 3b, is preferably placed on the lower part 2a, 3a, in particular snapped-on. A sealing element (not represented here in the figures), which welds the passage in the port 2a, 3a or in the connector 2, 3 to the bag volume, is preferably enclosed in a positive-locking manner, between the respective lower part 2a, 3a and the upper part 2b, 3b. The mentioned sealing element is a self-closing, resealable elastomer element, which can be penetrated with a spike and/or even with a needle, in order to withdraw or supply liquid. After removing the spike and/or the needle, the sealing element closes automatically. Polyisoprene can e.g. be used as the elastomer material. The upper part 2b, 3b of the connector 2, 3 also in each case comprises a covering, preferably a breakable cap 2c, 3c which covers the sealing element. The respective sealing element is therefore accessible only after removing or breaking off the cap 2c, 3c.

The infusion bag 1 also comprises, on the side opposite at least one port 2a, 3a, a hanger 4 for attaching the infusion bag to an infusion stand or a rack. The hanger 4 can be designed as a indent or stamped-out slot in the transverse weld seam 6.

Figure 2:
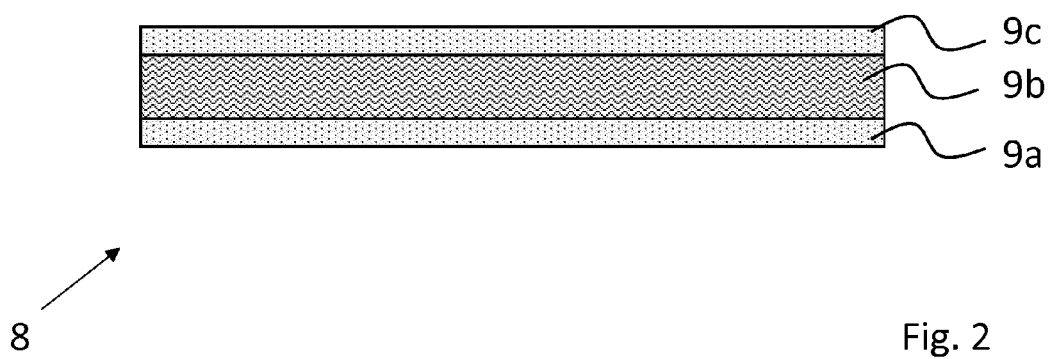
FIG. 2 is a schematic sectional view of the multi-layer PP film used for the infusion bag.

FIG. 2 is a schematic view of the multi-layer film 8 used for the infusion bag 1.

The film 8 consists of an inner layer 9c in contact with the medical liquid, an intermediate layer 9b and an outer layer 9a. When the films 8 are welded, the layers 9a, 9b, 9c become molten. In this case, all the material in the region of the weld seam passes to a molten state during the impulse welding.

The inner and the outer layer 9c, 9a are each 25-45 µm thick. The intermediate layer 9b has a thickness of 125-145 µm.

The outer layer 9a consists of a PP homopolymer, to which is added SEBS to improve the mechanical properties. The proportion by weight $G_{AM}$ of the PP homopolymer is in a range of 82-88% by weight. The proportion by weight $G_{AP}$ of the SEBS is in a range of 12-18% by weight.

The inner layer 9c consists of a PP random copolymer, to which is added SEBS to improve the mechanical properties. The proportion by weight $G_{IM}$ of the PP random copolymer is in a range of 77-83% by weight. The proportion by weight $G_{IP}$ of the SEBS is in a range of 17-23% by weight.

The intermediate layer 9b is softer than at least the outer layer 9a. It is also preferably softer than the inner layer 9c. The intermediate layer 9b consists of a PP random copolymer which is softer compared to the PP of the outer layer 9a, to which SEBS and optionally SIS is added. The proportion by weight $G_{MM}$ of the PP random copolymer is in a range of 47-53% by weight. The proportion by weight $G_{MP1}$ of the SEBS is in the range of 37-43% by weight. The proportion by weight $G_{MP2}$ of the second thermoplastic elastomer SIS is in the range of 7-13% by weight. The proportion by weight of thermoplastic elastomers (i.e. SEBS and optionally SIS) is in the intermediate layer 9b higher than in the inner and outer layer 9a, 9c.

The SEBS of the intermediate layer 9b also has a higher proportion by weight of ethylene/butylene than the SEBS in the inner and outer layer 9a, 9c. The $S/EB_M$ ratio in the intermediate layer 9b is 12/88. The $S/EB_A$ ratio in the outer layer 9a and/or in the inner layer 9c is, in contrast, 18/82.

In this way, a soft intermediate later 9b is provided with SEBS more finely distributed compared to the inner and outer layer 9c, 9a which improves to a great extent the mechanical properties of the infusion bag, in particular in the case of fall tests. These improved mechanical properties appear both at room temperature and also at lower temperatures of down to 4° C.

The film 8 is produced by co-extrusion of the individual layers 9a-9c.

The mechanical properties of an infusion bag 1 can be easily improved by the invention in particular in the region of the weld seams 6, 7 and over a wide temperature range.

LIST OF REFERENCE NUMERALS

1 Infusion bag
2 Connector for supplying an additive or medicine
2a Lower part or port of the connector
2b Upper part of the connector
2c Break-off part of the upper part
3 Connector for withdrawing a medical liquid
3a Lower part or port of the connector
3b Upper part of the connector
3c Break-off part of the upper part
4 Hanger
5 Region weld-in shuttle
6 Transverse weld seam
7 Longitudinal weld seam
8 Film
9a Outer layer
9b Intermediate layer
9c Inner layer

The invention claimed is:

1. A film comprising:
an inner layer;
an outer layer comprising a styrene-ethylene/butylene-styrene block copolymer in a matrix of a polymer; and
an intermediate layer disposed between the inner layer and the outer layer, the intermediate layer comprising a styrene-ethylene/butylene-styrene block copolymer in a matrix of a polymer,
wherein a ratio, by weight, of styrene to ethylene and butylene of the outer layer is between 0.18 and 0.28, and
wherein a ratio, by weight, of styrene to ethylene and butylene of the intermediate layer is between 0.10 and 0.16.

2. The film of claim 1, wherein the ratio, by weight, of styrene to ethylene and butylene of the outer layer is greater than 1.2 times the ratio, by weight, of styrene to ethylene and butylene of the intermediate layer.

3. The film of claim 2, wherein the ratio, by weight, of styrene to ethylene and butylene of the outer layer is greater than 1.5 times the ratio, by weight, of styrene to ethylene and butylene of the intermediate layer.

4. The film of claim 1, wherein the polymer of the outer layer is polypropylene, and
wherein the polymer of the intermediate layer is polypropylene.

5. The film of claim 4, wherein the inner layer comprises a styrene-ethylene/butylene-styrene block copolymer in a matrix of polypropylene.

6. The film of claim 5, wherein a ratio, by weight, of styrene to ethylene and butylene of the inner layer is greater than the ratio, by weight, of styrene to ethylene and butylene of the intermediate layer.

7. The film of claim 6, wherein the ratio, by weight, of styrene to ethylene and butylene of the inner layer is greater than 1.2 times the ratio, by weight, of styrene to ethylene and butylene of the intermediate layer.

8. The film of claim 7, wherein the ratio, by weight, of styrene to ethylene and butylene of the inner layer is greater than 1.5 times the ratio, by weight, of styrene to ethylene and butylene of the intermediate layer.

9. The film of claim 5, wherein a ratio, by weight, of styrene to ethylene and butylene of the inner layer is equal to the ratio, by weight, of styrene to ethylene and butylene of the outer layer.

10. The film of claim 1, wherein the intermediate layer further comprises a styrene-isoprene-styrene block copolymer in the matrix of the polymer.

11. The film of claim 1,
wherein the ratio, by weight, of styrene to ethylene and butylene of the outer layer is between 0.20 and 0.24, and
wherein the ratio, by weight, of styrene to ethylene and butylene of the intermediate layer is between 0.13 and 0.14.

12. The film of claim 1,
wherein the inner layer comprises styrene-ethylene/butylene-styrene block copolymer in a matrix of a polymer,
wherein a ratio, by weight, of styrene to ethylene and butylene of the inner layer is between 0.18 and 0.28.

13. The film of claim 12,
wherein the ratio, by weight, of styrene to ethylene and butylene of the inner layer is between 0.20 and 0.24, and
wherein the ratio, by weight, of styrene to ethylene and butylene of the intermediate layer is between 0.13 and 0.14.

14. A medical package comprising a film, the medical package having at least one seam, and the medical package configured to be filled with a liquid, wherein the film comprises:
an inner layer;
an outer layer comprising a styrene-ethylene/butylene-styrene block copolymer in a matrix of a polymer; and
an intermediate layer disposed between the inner layer and the outer layer, the intermediate layer comprising a styrene-ethylene/butylene-styrene block copolymer in a matrix of a polymer,
wherein a ratio, by weight, of styrene to ethylene and butylene of the outer layer is between 0.18 and 0.28, and
wherein a ratio, by weight, of styrene to ethylene and butylene of the intermediate layer is between 0.10 and 0.16.

15. The medical package of claim 14, wherein the ratio, by weight, of styrene to ethylene and butylene of the outer layer is greater than 1.2 times the ratio, by weight, of styrene to ethylene and butylene of the intermediate layer.

16. The medical package of claim 14, wherein the polymer of the outer layer is polypropylene,
wherein the polymer of the matrix of the intermediate layer is polypropylene, and
wherein the inner layer comprises a styrene-ethylene/butylene-styrene block copolymer in a matrix of polypropylene.

17. The medical package of claim 14, wherein the intermediate layer further comprises a styrene-isoprene-styrene block copolymer in the matrix of the polymer.

18. The medical package of claim 14,
wherein the inner layer comprises a styrene-ethylene/butylene-styrene block copolymer in a matrix of a polymer, and
wherein a ratio, by weight, of styrene to ethylene and butylene of the inner layer is between 0.18 and 0.28.

* * * * *